(12) United States Patent
Nakamura et al.

(10) Patent No.: US 10,719,697 B2
(45) Date of Patent: Jul. 21, 2020

(54) GESTURE JUDGMENT DEVICE, GESTURE OPERATION DEVICE, AND GESTURE JUDGMENT METHOD

(71) Applicant: MITSUBISHI ELECTRIC CORPORATION, Tokyo (JP)

(72) Inventors: Yudai Nakamura, Tokyo (JP); Masashi Kamiya, Tokyo (JP); Masahiro Naito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 55 days.

(21) Appl. No.: 16/309,789

(22) PCT Filed: Apr. 21, 2017

(86) PCT No.: PCT/JP2017/016038
§ 371 (c)(1),
(2) Date: Dec. 13, 2018

(87) PCT Pub. No.: WO2018/042751
PCT Pub. Date: Mar. 8, 2018

(65) Prior Publication Data
US 2020/0143150 A1    May 7, 2020

(30) Foreign Application Priority Data

Sep. 1, 2016  (JP) .................................. 2016-170502

(51) Int. Cl.
*G06K 9/00*     (2006.01)
*G06T 7/246*    (2017.01)
*G06F 3/01*     (2006.01)

(52) U.S. Cl.
CPC ......... *G06K 9/00335* (2013.01); *G06F 3/017* (2013.01); *G06K 9/00288* (2013.01);
(Continued)

(58) Field of Classification Search
USPC ......................................................... 345/156
See application file for complete search history.

(56) References Cited

U.S. PATENT DOCUMENTS

2001/0012001 A1*  8/2001  Rekimoto ............... G06F 3/017
                                                                345/173
2010/0026649 A1*  2/2010  Shimizu .............. G06F 3/04883
                                                                345/173
(Continued)

FOREIGN PATENT DOCUMENTS

JP    2012-18622 A    1/2012
JP    2012-58928 A    3/2012
(Continued)

*Primary Examiner* — Chineyere D Wills-Burns
(74) *Attorney, Agent, or Firm* — Birch, Stewart, Kolasch & Birch, LLP

(57) ABSTRACT

A gesture judgment device includes a reference part detection unit that outputs reference part information indicating a reference part region, a movement extraction unit that outputs movement information indicating a movement region, a reference part disappearance judgment unit that generates a reference part disappearance information, a timing judgment unit that judges whether first timing indicated by the reference part disappearance information and second timing of occurrence of a frame in which the movement region overlaps with the reference part region indicated by the reference part information are synchronized with each other or not and outputs a timing judgment result as the result of the judging, and an operation judgment unit that judges contents of a gesture operation performed by an operator based on the timing judgment result and the movement information.

18 Claims, 15 Drawing Sheets

(52) U.S. Cl.
CPC ......... *G06K 9/00389* (2013.01); *G06T 7/248* (2017.01); *G06T 2207/10016* (2013.01); *G06T 2207/30201* (2013.01)

(56) References Cited

U.S. PATENT DOCUMENTS

| | | | |
|---|---|---|---|
| 2011/0222726 A1* | 9/2011 | Ruan | G06K 9/00355 382/103 |
| 2012/0057792 A1* | 3/2012 | Sakai | G06F 3/017 382/190 |
| 2012/0162409 A1* | 6/2012 | Setiawan | G06F 3/011 348/135 |
| 2013/0088426 A1* | 4/2013 | Shigeta | G06F 3/017 345/156 |
| 2013/0169537 A1* | 7/2013 | Tsurumi | G06F 3/005 345/158 |
| 2013/0182898 A1* | 7/2013 | Maeda | G06K 9/00335 382/103 |
| 2014/0104161 A1* | 4/2014 | Liao | G06F 3/017 345/156 |
| 2014/0152557 A1* | 6/2014 | Yamamoto | G06F 3/017 345/156 |
| 2014/0247964 A1* | 9/2014 | Kurokawa | G06F 3/005 382/103 |
| 2015/0338915 A1* | 11/2015 | Publicover | H04N 5/44504 345/633 |

FOREIGN PATENT DOCUMENTS

| | | |
|---|---|---|
| JP | 2012-137899 A | 7/2012 |
| JP | 2013-12158 A | 1/2013 |
| JP | 2015-22525 A | 2/2015 |

\* cited by examiner

| n5 | n6 | n7 |
|----|----|----|
| n4 | Pc | n0 |
| n3 | n2 | n1 |

GESTURE JUDGMENT DEVICE, GESTURE OPERATION DEVICE, AND GESTURE JUDGMENT METHOD

TECHNICAL FIELD

The present invention relates to a gesture judgment device that judges the contents of a gesture operation performed by an operator, a gesture operation device that generates an operation command for operating equipment based on the contents of the gesture operation, and a gesture judgment method for judging the contents of the gesture operation performed by the operator.

BACKGROUND ART

When operating equipment such as a home electric appliance or vehicle-mounted equipment, it is effective to perform a gesture operation by making a hand motion, which enables an operator to operate the equipment without using a remote control or without touching an operation panel. Further, in cases of operating equipment for digital signage or the like in a public facility or a factory, it is difficult to use touchscreens since it cannot be assumed that every operator has a remote control and many of display devices are large in size. Therefore, the gesture operation having the above-described feature is effective. In order to achieve such a gesture operation, images of the operator composed of a plurality of frames are captured with an image capturing device such as a camera, movement between the frames is detected and thus the gesture operation is judged, for example. However, this method has problems in that a gesture is easily misjudged in a circumstance where the background greatly changes, such as an in-car environment, and that it is difficult to distinguish between the gesture operation and an unintended motion by the operator.

To resolve these problems, there exists a technology that increases the accuracy of the gesture judgment by limiting a target region of the gesture operation judgment with reference to the position of the operator's face, judging a specified operation by the operator in regard to the limited region, judging whether or not the operation was performed continuously for a predetermined period, and thereby distinguishing between the gesture operation and a change in the background or between the gesture operation and an unintended motion by the operator (see Patent Reference 1, for example).

PRIOR ART REFERENCE

Patent Reference

Patent Reference 1: Japanese Patent Application Publication No. 2012-58928

SUMMARY OF THE INVENTION

Problem to be Solved by the Invention

However, in the technology described in the Patent Reference 1, the operator has to perform a predetermined operation continuously for a predetermined period in order to increase the gesture judgment accuracy, and thus the technology is unsuitable for judging a gesture operation that can be performed in a short time, such as an operation of swiping a hand (hereinafter referred to also as a "swipe").

An object of the present invention, which has been made to resolve the above-described problem of the conventional technology, is to realize high-accuracy gesture judgment by reducing the misjudgment on the gesture due to a change in the background and an unintended motion by the operator even when the operator performs a short-duration gesture operation.

Means for Solving the Problem

A gesture judgment device according to the present invention is a gesture judgment device for judging contents of a gesture operation performed by an operator, including: a reference part detection unit that detects a reference part in a plurality of frame images successively acquired as captured images and outputs reference part information indicating a reference part region where the reference part exists in regard to each of the plurality of frame images; a movement extraction unit that extracts movement between frame images in the plurality of frame images and outputs movement information indicating a movement region where the movement occurred; a reference part disappearance judgment unit that generates reference part disappearance information, indicating first timing of occurrence of a frame image in which the reference part is not detected, based on a result of the detecting indicated by the reference part information; a timing judgment unit that judges whether the first timing indicated by the reference part disappearance information and second timing of occurrence of a frame in which the movement region indicated by the movement information and the reference part region indicated by the reference part information overlap with each other are synchronized with each other or not and outputs a timing judgment result that is a result of the judging; and an operation judgment unit that judges the contents of the gesture operation performed by the operator based on the timing judgment result and the movement information.

A gesture operation device according to the present invention includes the above-described gesture judgment device and a command generation unit that generates an operation command for operating equipment based on the contents of the gesture operation judged by the operation judgment unit.

A gesture judgment method according to the present invention includes: a reference part detection step of detecting a reference part in a plurality of frame images successively acquired as captured images and outputting reference part information indicating a reference part region where the reference part exists in regard to each of the plurality of frame images; a movement extraction step of extracting movement between frame images in the plurality of frame images and outputting movement information indicating a movement region where the movement occurred; a reference part disappearance judgment step of generating reference part disappearance information, indicating first timing of occurrence of a frame image in which the reference part is not detected, based on a result of the detecting indicated by the reference part information; a timing judgment step of judging whether the first timing indicated by the reference part disappearance information and second timing of occurrence of a frame in which the movement region indicated by the movement information and the reference part region indicated by the reference part information overlap with each other are synchronized with each other or not and outputting a timing judgment result that is a result of the judging; and an operation judgment step of judging contents of a gesture operation performed by an operator based on the timing judgment result and the movement information.

Effect of the Invention

With the gesture judgment device, the gesture operation device and the gesture judgment method according to the present invention, it is possible to realize high-accuracy gesture judgment by reducing the misjudgment on the gesture due to a change in the background and an unintended motion by the operator even when the operator performs a short-duration gesture operation.

MODE FOR CARRYING OUT THE INVENTION (1) First Embodiment (1-1) Configuration

Figure 1:
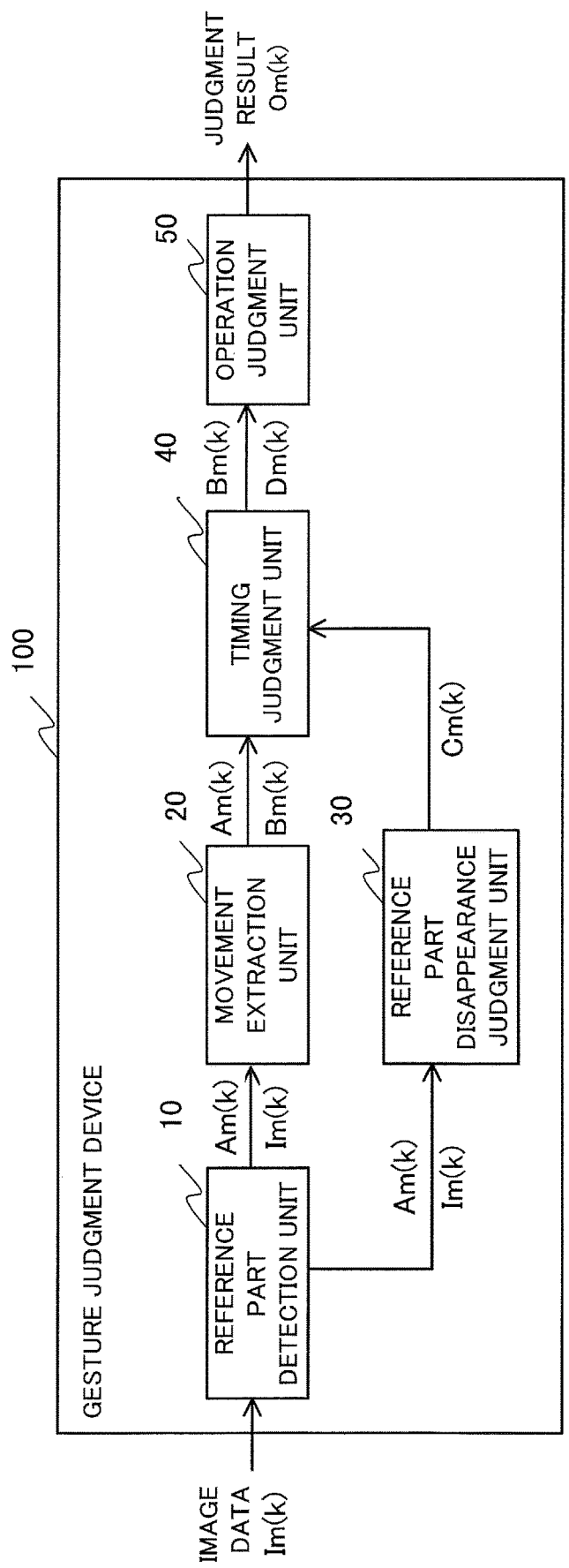
FIG. 1 is a block diagram showing a general configuration of a gesture judgment device according to a first embodiment of the present invention.

FIG. 1 is a block diagram showing the general configuration of a gesture judgment device 100 according to a first embodiment of the present invention. The gesture judgment device 100 is a device capable of executing a gesture judgment method according to the first embodiment. As shown in FIG. 1, the gesture judgment device 100 includes a reference part detection unit 10, a movement extraction unit 20, a reference part disappearance judgment unit 30, a timing judgment unit 40 and an operation judgment unit 50.

First, a general outline of the gesture judgment device 100 will be described below. The gesture judgment device 100 receives image data (captured images) Im(k) of a series of frames representing video images of a space including the operator captured at a predetermined frame rate. Here, k represents a frame number (positive integer) assigned to each frame. For example, a frame provided at a time next to a frame Im(k) is represented as Im(k+1).

The frame rate is desired to be set at 30 frames per second, for example. The image data can be color images, gray-scale images or range images, for example. For simplicity of explanation, the following description will be given of a case where the image data are 8-bit gradation gray-scale images with a width of 640 pixels and a height of 480 pixels. As shown in FIG. 1, the gesture judgment device 100 performs a series of operations for outputting a gesture judgment result Om(k) based on the image data Im(k) of a series of frames.

The reference part detection unit 10 detects at least one operator's part as a reference (reference part as a predetermined body part) in the image data Im(k) provided as input information from an image capturing device and thereby generates reference part information Am(k) indicating the reference part. The reference part in the first embodiment is assumed to be the operator's face in the following description. However, the reference part can also be a part other than the operator's face. For example, the reference part can be either a part belonging to the face (face, eye, eyebrow, nose, mouth, forehead, cheek, chin, etc.) or a body part other than the face such as the head or a shoulder.

The reference part information Am(k) can include information regarding the presence/absence of the detection of the reference part, central coordinates of the detected reference part, the size of the detected reference part, and so forth. The generated reference part information Am(k) is supplied to the movement extraction unit 20 and the reference part disappearance judgment unit 30. Further, the reference part detection unit 10 outputs the image data Im(k) of a series of frames to the movement extraction unit 20 and the reference part disappearance judgment unit 30.

The movement extraction unit 20 receives the reference part information Am(k) and the latest image data Im(k), extracts a region in the vicinity of the reference part, where movement between frames occurred, from the latest image data Im(k) and at least one piece of image data Im(k−α) among image data having frame numbers different from that of Im(k), and generates movement information Bm(k) indicating the extracted region where movement occurred. Here, α is an integer larger than or equal to 1. The movement information Bm(k) includes barycenter data regarding a region where movement between image data is major. The generated movement information Bm(k) is supplied to the timing judgment unit 40.

The reference part disappearance judgment unit 30 receives the image data Im(k) and the reference part information Am(k) from the reference part detection unit 10, judges disappearance of the reference part in the image data Im(k) by making a comparison with past reference part information Am(k−α) stored in a non-illustrated storage unit, and thereby generates a reference part disappearance judgment result (reference part disappearance information) Cm(k) indicating the timing of occurrence of a frame image in which the reference part is not detected (first timing). Here, α is an integer larger than or equal to 1. The reference part disappearance judgment result Cm(k) includes information on whether or not the reference part has disappeared in the image data Im(k). For example, a value of 1 is outputted if the reference part has disappeared and a value of 0 is outputted if the reference part has not disappeared. The reference part disappearance judgment result Cm(k) generated by the reference part disappearance judgment unit 30 is supplied to the timing judgment unit 40.

The timing judgment unit 40 receives the reference part information Am(k), the movement information Bm(k) and the reference part disappearance judgment result Cm(k), judges whether the movement information Bm(k) was caused by a gesture by the operator or a different phenomenon (a change in the background and an unintended motion by the operator), and generates a timing judgment result Dm(k) indicating the result of the judging. Specifically, the timing judgment unit 40 judges whether the first timing of the occurrence of the frame image in which the reference part is not detected, indicated by the reference part disappearance judgment result Cm(k), and second timing of occurrence of a frame in which a movement region indicated by the movement information Bm(k) and a reference part region indicated by the reference part information Am(k) overlap with each other are synchronized with each other or not, and outputs the timing judgment result Dm(k) that is the result of the judging. The timing judgment result Dm(k) is supplied to the operation judgment unit 50.

The operation judgment unit 50 receives the movement information Bm(k) and the timing judgment result Dm(k) from the timing judgment unit 40, judges the contents of the gesture operation based on the timing judgment result Dm(k) and at least one past timing judgment result Dm(k−α), and outputs the result of the judging as the gesture judgment result Om(k). Here, a is an integer larger than or equal to 1.

Next, the operation of the gesture judgment device 100 will be described in more detail. The reference part detection unit 10 generates the reference part information Am(k) by detecting at least one predetermined reference part of the operator in the image data Im(k) provided as the input. For simplicity of explanation, the following description will be given of a case where the reference part is the operator's face.

In the case where the reference part is the operator's face, the reference part information Am(k) includes, for example, information regarding the presence/absence of the detection of these reference parts, central coordinates Fc (Fcx, Fcy) of a rectangle surrounding the operator's face, and the width Fcw and the height Fch of the rectangle. Here, the presence/absence of the detection of the reference part is set at 1 when the reference part was detected successfully and 0 when the reference part was not detected, for example. The central coordinates of the rectangle are represented in a coordinate system in the image data, wherein the top left corner of the image is defined as the origin, the rightward direction in the image is defined as a positive direction of the x axis, and the downward direction in the image is defined as a positive direction of the y axis. The detection of the operator's face can be implemented by using a publicly known means. For example, a rectangular region surrounding the operator's face can be extracted by using a cascade-type face detector employing Haar-like feature values.

The movement extraction unit 20 receives the latest image data Im(k), extracts a region in the vicinity of the reference part, where movement between image data occurred, from the latest image data Im(k) and at least one piece of image data Im(k−α) among the image data having frame numbers different from that of Im(k), and generates the movement information Bm(k) based on the result of the extraction. For simplicity of explanation, it is assumed in the following description that the movement information Bm(k) is generated from the reference part information Am(k), the latest image data Im(k), and one-frame previous image data Im(k−1) stored in the non-illustrated storage unit. The movement information Bm(k) includes the barycenter data regarding the region where movement between image data is major.

A publicly known technology is usable for evaluating magnitude of the movement between image data. For example, an image is divided into a plurality of rectangular regions (movement feature extraction blocks, hereinafter also referred to simply as "blocks"), a feature (texture feature TF) representing texture (appearance) is calculated for each block, and difference between image data is evaluated. In this case, in a block where the movement is major, the appearance difference between image data is great and the difference in the texture feature is great, by which the magnitude of the movement between the image data can be evaluated in regard to each cell.

In the following, a histogram of a CSLBP (Center Symmetric Local Binary Pattern) feature, which is hardly affected by fluctuations of environmental light, is calculated in regard to each cell, and a region having movement is extracted by evaluating cells in which the movement between image data is major. The CSLBP feature is a feature obtained by binary coding the luminance gradient in regard to pixels in a square-shaped feature extraction region centering at each pixel.

Figures 2, 3:
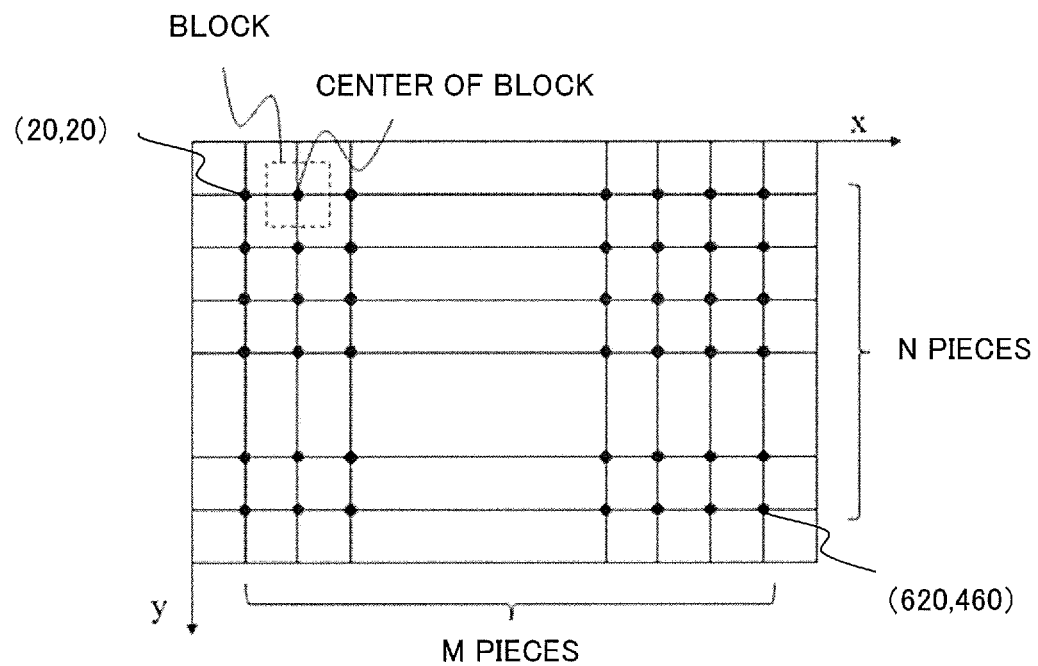
FIG. 2 is a diagram showing arrangement of blocks in calculation of a texture feature in the first embodiment.
FIG. 3 is a diagram showing arrangement of pixels used for calculation of a CSLBP feature in the first embodiment.

First, arrangement of blocks in the image data will be explained below with reference to FIG. 2. FIG. 2 is a diagram showing the arrangement of blocks in the calculation of the texture feature in the first embodiment. As shown in FIG. 2, centers of blocks are arranged like a grid (M pieces in the x-axis direction, N pieces in the y-axis direction) in the image data. M and N are positive integers. The size of each block shown in FIG. 2 is assumed to be 40 pixels in both of the width Blw and the height Blh. In the following example, M and N are set at 16 and 12 respectively and the blocks are arranged evenly in both of the x-axis direction and the y-axis direction. The central coordinates of the block at the upper left end in the image data are assumed to be (20, 20). In this case, the central coordinates of the block at the lower right end in the image data are (620, 460).

Next, an example of a method of calculating the histogram of the CSLBP feature for each block will be described below with reference to FIG. 3. The CSLBP feature is calculated for all the pixels included in each block.

FIG. 3 is a diagram showing arrangement of pixels used for the calculation of the CSLBP feature in the first embodiment. Shown in FIG. 3 are numbers assigned to pixels in a 3×3 pixel region (3 pixels vertically, 3 pixels horizontally) centering at a pixel Pc(x, y) used for the calculation of the CSLBP feature regarding each pixel Pc(x, y). The CSLBP feature B(x, y) regarding the pixel Pc(x, y) is calculated according to the following expression (1) by using luminance values of the 3×3 pixels centering at the pixel Pc(x, y) and is represented by a value from 0 to 15:

$$B(x,y)=s(n0-n4)\times 2^0+s(n1-n5)\times 2^1+s(n2-n6)\times 2^2+s(n3-n7)\times 2^3 \quad (1)$$

In the expression (1), n0 to n7 respectively represent the luminance values of the pixels n0 to n7 shown in FIG. 3. Further, s(a) represents a threshold function; s(a)=1 when a >T1 and s(a)=0 when a ≤T1. Since s(a) equals 0 or 1, the CSLBP feature B(x, y) is an integer, and the range of values that the CSLBP feature B(x, y) can take on is 0≤B(x, y)<16 ∀x, y, namely, B(x, y) is larger than or equal to 0 and less than 16 for any x and y. The threshold value T1 is desired to be approximately 1% of the greatest value that the luminance value can take on, for example, and is set as T1=3 when the value of the luminance value ranges from 0 to 255.

Figure 4:
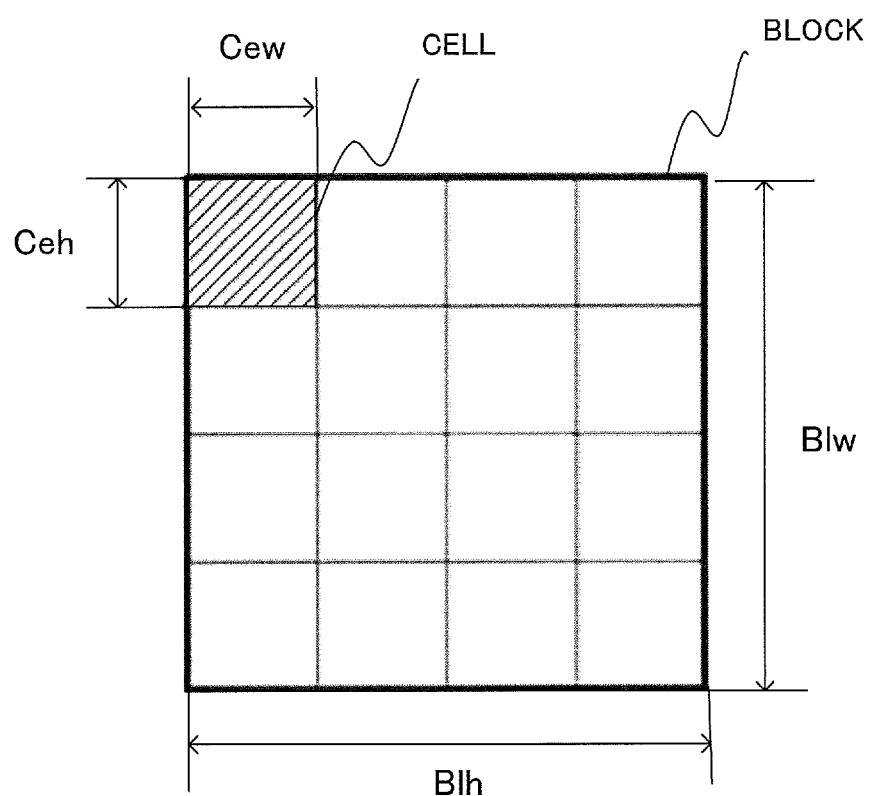
FIG. 4 is a diagram showing arrangement of cells in a block in calculation of a texture feature in the first embodiment.

Next, a method of calculating the histogram of each block by using the CSLBP features calculated for all the pixels in the block will be described below with reference to FIG. 4. FIG. 4 is a diagram showing arrangement of cells in one of the blocks in the texture feature calculation in the first embodiment. As shown in FIG. 4, the block having the width Blw and the height Blh is further divided into cells each having a width Cew and a height Ceh. In the following explanation, the width Cew and the height Ceh are set as Cew=5 and Ceh=5 and each block is divided into 4×4=16 cells.

Each cell includes Cew×Ceh pixels, and the CSLBP feature has been calculated for each cell. A histogram regarding each cell is generated by using these CSLBP features. In this case, the histogram regarding each cell is obtained as a 16-dimensional vector since the CSLBP feature can take on an integer from 0 to 15. Then, the 16-dimensional vectors respectively calculated for the 16 cells in the block are combined together and the resultant 16×16=256-dimensional vector is obtained as the texture feature TF in each block.

For the image data Im(k) and the image data Im(k−1), the texture feature TF is calculated in each block, and a change amount dTF of the texture feature TF is calculated in each block. The change amount dTF is obtained by using the Euclidean distance between vectors, for example. By calculating the change amount dTF as above, the magnitude of the movement in each block can be evaluated.

The blocks are classified into regions where the change was great and regions other than the regions where the change was great (i.e., regions where the change was slight) by binarizing the change amount dTF calculated in each block by using a threshold value Tth. For example, a block satisfying threshold value Tth≤change amount dTF are labeled with 1 and regarded as regions where the change was great. In contrast, a block satisfying threshold value Tth>change amount dTF are labeled with 0 and regarded as regions where the change was slight.

After the binarization of the blocks, the region having major movement is divided into groups by connecting together the blocks labeled with 1. Then, a group having the largest size (a region including a great number of blocks connected together) is specified as the movement region and the barycenter Mg(k) of the group is calculated, by which the movement information Bm(k) is generated.

The reference part disappearance judgment unit 30 receives the image data Im(k) and the reference part information Am(k), judges the disappearance of the reference part in the image data Im(k) by making a comparison with the past reference part information Am(k−α), and thereby generates the reference part disappearance judgment result Cm(k).

For example, the reference part disappearance judgment unit 30 makes the reference part disappearance judgment based on the presence/absence of the reference part detection included in the reference part information Am(k) provided as an input. When the reference part detection is "present" in Am(k), the reference part disappearance is judged to have not occurred, and the reference part disappearance judgment result Cm(k) is set at "0" and supplied to the timing judgment unit 40. When the reference part detection is "absent" in Am(k), the reference part disappearance is judged to have occurred, and the reference part disappearance judgment result Cm(k) is set at "1" and supplied to the timing judgment unit 40.

The timing judgment unit 40 receives the reference part information Am(k), the movement information Bm(k) and the reference part disappearance judgment result Cm(k), judges whether the movement information Bm(k) is caused by a gesture by the operator and a different phenomenon (a change in the background or an unintended motion by the operator), and thereby generates the timing judgment result Dm(k). To explain an example of the timing judgment, a motion of moving a hand in front of the face to cross the face will hereinafter be assumed to be the target of the gesture judgment. An operation as an example of the timing judgment will be described below with reference to FIG. 5 to FIG. 8.

Figure 5:
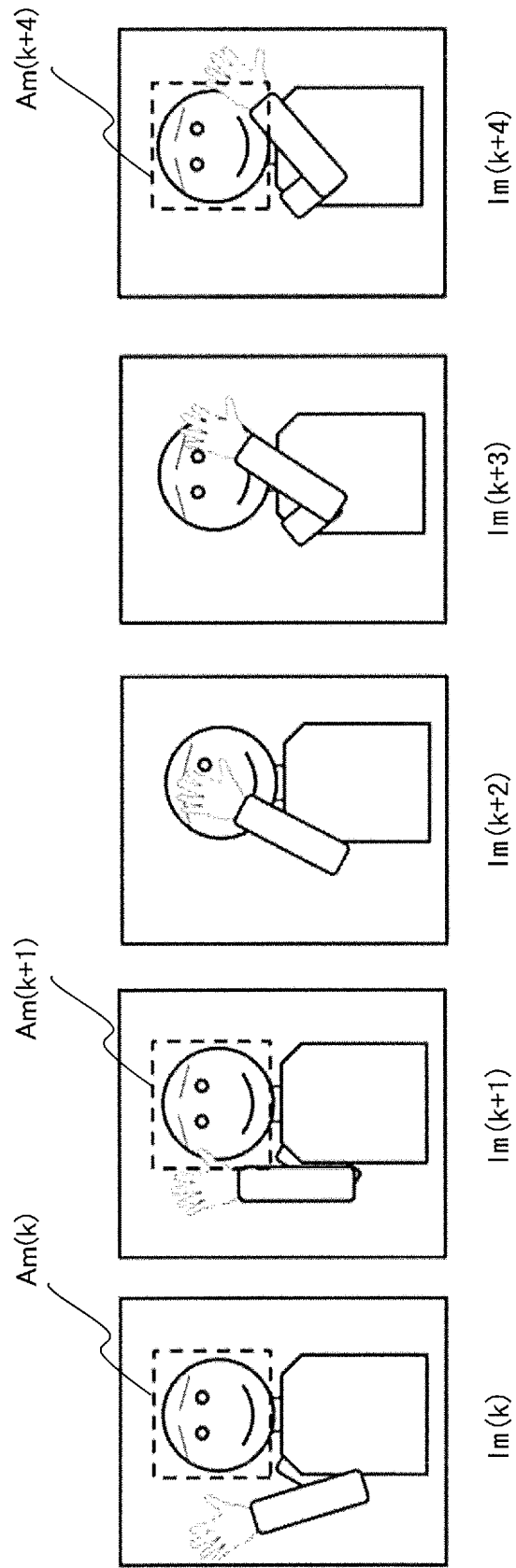
FIG. 5 is a diagram showing an example of a series of motions representing a gesture operation in the first embodiment (a motion of waving a hand from the left-hand side to the right-hand side in an image).

FIG. 5 is a diagram showing an example of a series of motions representing a gesture operation in the first embodiment (a motion of waving a hand from the left-hand side to the right-hand side in the image, namely, the swipe). FIG. 5 shows images in the vicinity of the operator extracted from the image data Im(k) to Im(k+4) when the operator made the motion of moving a hand in front of the face to cross the face and status of detection of the reference part (face) in each piece of image data.

Each dotted line rectangle shown in FIG. 5 indicates the position of detection of the reference part as the reference part region. As shown in FIG. 5, in Im(k), Im(k+1) and Im(k+4), the face as the reference part was clearly captured in the image data, and accordingly, the reference part is detected and the face position is surrounded by the dotted line rectangle. In contrast, in Im(k+2) and Im(k+3), the face was hidden by the hand due to the gesture operation, and accordingly, the reference part is not detected and the dotted line rectangle does not exist.

Figure 6:
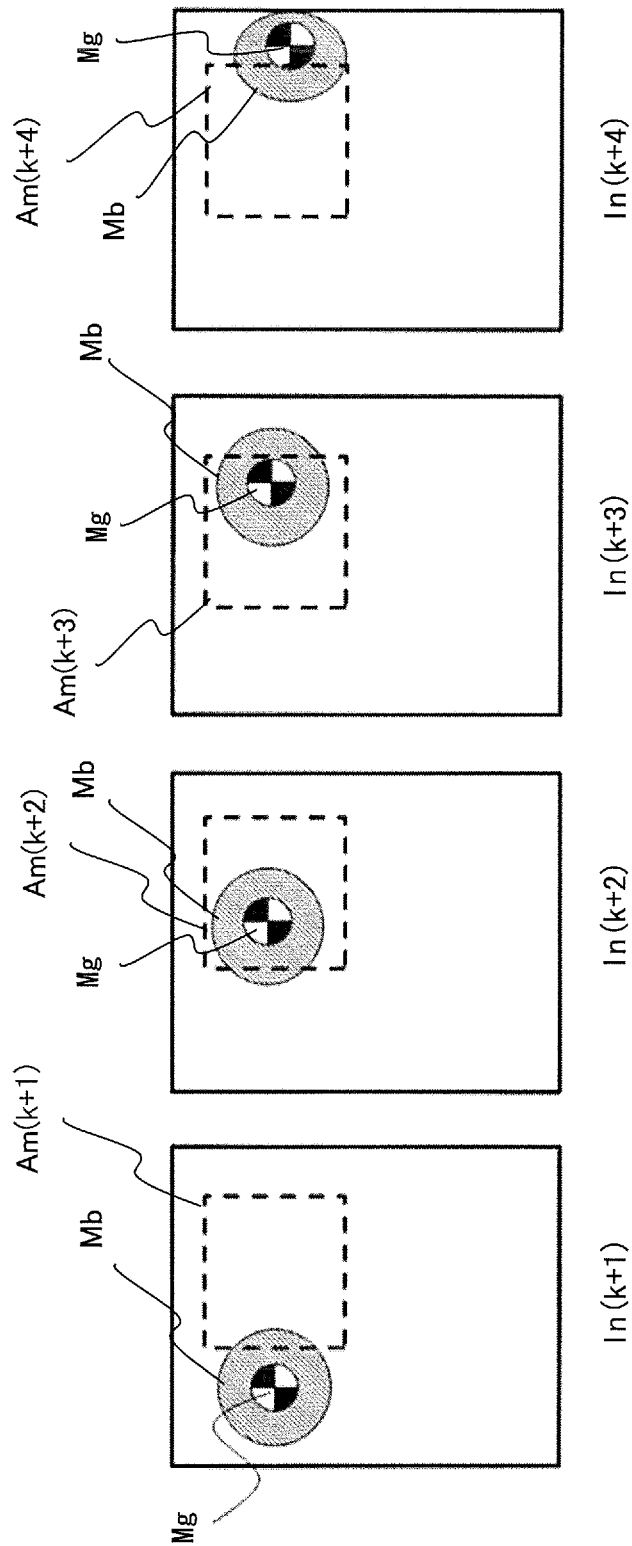
FIG. 6 is a diagram showing a movement region and a position of a barycenter of the movement region when the series of motions representing the gesture operation (the motion of waving a hand from the left-hand side to the right-hand side in the image) in the first embodiment is made.

FIG. 6 is a diagram showing the movement region Mb and the position of the barycenter Mg of the movement region Mb when the series of motions representing the gesture operation (the motion of waving a hand from the left-hand side to the right-hand side in the image) in the first embodiment is made. FIG. 6 shows the positional relationship between the region Mb having major movement and the barycenter Mg of the region Mb in regard to each piece of image data in FIG. 5. In FIG. 6, the position of the reference part is indicated by a dotted line rectangle at the same position as in FIG. 5. In(k+1) to In(k+4) in FIG. 6 respectively correspond to Im(k+1) to Im(k+4) in FIG. 5. While the reference part is not detected in Im(k+2) and Im(k+3) in FIG. 5, the reference part is drawn in In(k+2) and In(k+3) in FIG. 6 corresponding to Im(k+2) and Im(k+3), the reason for which will be described later.

Based on FIG. 5 and FIG. 6, conditions satisfying the gesture judgment can be summarized into the following four conditions (A1) to (AA):

Condition (A1): The reference part is detected in the initial state and the reference part disappears once due to a gesture.

Condition (A2): The movement region Mb is included in the rectangular region of the reference part when the reference part disappears (first timing).

Condition (A3): The movement region Mb exists in the vicinity (on the left-hand side in FIG. 6, a first side) of the reference part immediately before the disappearance of the reference part (third timing).

Condition (A4): The movement region Mb exists on a side (on the right-hand side in FIG. 6, a second side) opposite to the side in the condition (A3) immediately after the disappearance of the reference part (fourth timing).

The gesture judgment can be made by judging the synchronization of the timing of the existence of the movement region Mb in the vicinity of the reference part and the timing of the reference part disappearance based on the aforementioned four conditions (A1) to (A4) and detecting movement of the position of the existence of the movement region Mb. The timing judgment unit 40 judges the synchronization of the former timing of the existence of the movement region Mb in the vicinity of the reference part and the timing of the reference part disappearance and supplies the timing judgment result Dm(k) to the operation judgment unit 50. Then, the operation judgment unit 50 judges the gesture based on the timing judgment result Dm(k) and status of movement of the movement region Mb.

Figure 7:
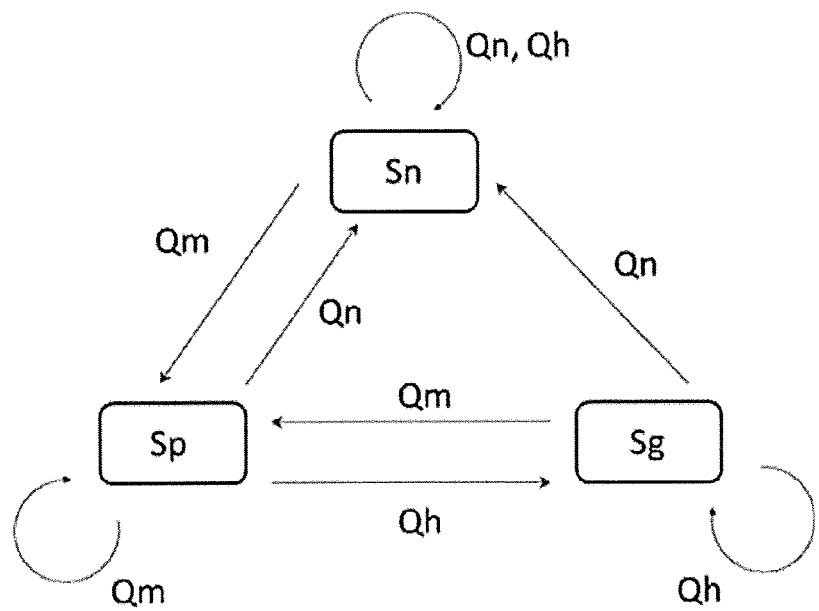
FIG. 7 is a diagram showing an example of a state transition diagram of a timing judgment unit in the first embodiment.

Next, a method implementing the above-described timing judgment will be described below with reference to FIG. 7. FIG. 7 is a diagram showing an example of a state transition diagram of the timing judgment unit 40 in the first embodiment. As shown in FIG. 7, the timing judgment unit 40 assumes a state S(k), and the timing judgment result Dm(k) includes the state S(k) the timing judgment unit 40 assumes. The state S(k) can take on one of the three states Sn, Sp and Sg shown in FIG. 7, and conditions for state transition are three conditions Qn, Qm and Qh.

Figure 8:
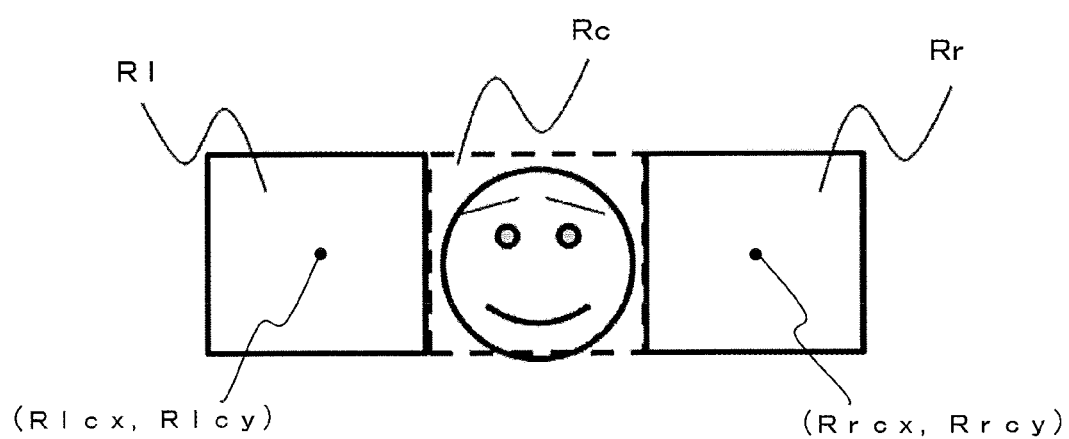
FIG. 8 is a diagram for explaining a definition of three regions on the basis of reference part information in the first embodiment.

The three states Sn, Sp and Sg and the three conditions Qn, Qm and Qh will be explained below with reference to FIG. 8. FIG. 8 is a diagram for explaining the definition of three regions Rl, Rc and Rr on the basis of the reference part information Am in the first embodiment. The region Rl is a region situated to the left of (a negative direction of x axis) the reference part in the image data and is defined by a center Rlc (Rlcx, Rlcy), a width Rlw and a height Rlh. The region Rc is a region situated at the center of the image data of the reference part and is defined by a center Rcc (Rccx, Rccy), a width Rcw and a height Rch. The region Rr is a region situated to the right of (the positive direction of the x axis) the reference part in the image data and is defined by a center Rrc (Rrcx, Rrcy), a width Rrw and a height Rrh.

The condition Qm is a condition that the barycenter Mg exists in the region Rl or the region Rr and the reference part disappearance judgment result Cm is "0". The condition Qh is a condition that the barycenter Mg exists in the region Rc and the reference part disappearance judgment result Cm is "1". The condition Qn represents all conditions excluding the condition Qm or Qh.

As shown in FIG. 7, the state Sn is the initial state of S(k). When the condition Qm is satisfied in the state Sn, the state shifts to the state Sp. Otherwise, the state Sn is maintained with no state transition. When the condition Qh is satisfied in the state Sp, the state shifts to the state Sg. When the condition Qm is satisfied in the state Sp, the state Sp is maintained with no state transition. When the condition Qn is satisfied in the state Sg, the state shifts to the state Sn. When the condition Qm is satisfied in the state Sg, the state shifts to the state Sp. When the condition Qh is satisfied in the state Sg, the state Sg is maintained with no state transition. When the condition Qn is satisfied in the state Sp, the state shifts to the state Sn.

How the transition of the state S(k) occurs in regard to the series of image data shown in FIG. 5 will be explained below. First, in the initial state, S(k)=Sn holds. Subsequently, at a time point when Im(k+1) is inputted, the barycenter Mg exists in the region Rl and the reference part disappearance judgment result is "0", and thus the condition Qm is satisfied and the state shifts to S(k+1)=Sp.

Subsequently, in Im(k+2), the barycenter Mg exists in the region Rc and the reference part disappearance judgment result is "1", and thus the condition Qh is satisfied and the state shifts to S(k+2)=Sg. In Im(k+3), the condition Qh is satisfied as in Im(k+2), and thus the state remains in S(k+3)=Sg. In Im(k+4), Mg exists in Rr and the reference part disappearance judgment result is "0", and thus the state shifts to S(k+4)=Sp.

As above, in response to the gesture shown in FIG. 5, the state of the timing judgment unit 40 shifts in the order of Sp, Sg and Sp (namely, Sp→Sg→Sp). By judging this state transition, a gesture satisfying the condition (A1) to the condition (A4) can be detected.

Figure 9:
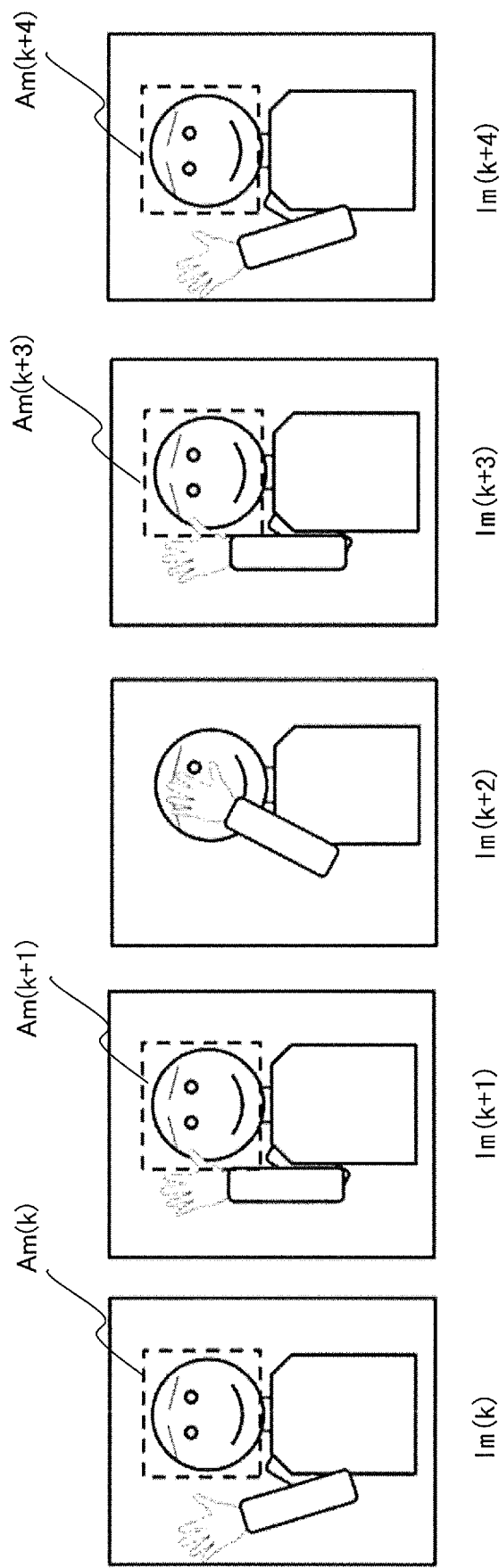
FIG. 9 is a diagram showing an example of a series of motions representing a gesture operation in the first embodiment (motions of moving a hand from the left-hand side in the image to a position in front of a face and then waving the hand back to the left-hand side).

This state transition can be caused also by a motion shown in FIG. 9. FIG. 9 is a diagram showing an example of a series of motions representing a gesture operation in the first embodiment (motions of moving a hand from the left-hand side in the image to a position in front of a face and then waving the hand back to the left-hand side). The difference between the motions in FIG. 5 and FIG. 9 lies in whether the movement region Mb just after the disappearance of the reference part exists on the side opposite to the side of existence of the movement region Mb just before the disappearance of the reference part (FIG. 5) or on the same side (FIG. 9). The judgment on this difference is made by the operation judgment unit 50 in the latter stage.

In cases where the motion of FIG. 9 is made, conditions satisfying the gesture judgment can be summarized into the following four conditions (B1) to (B4):

Condition (B1): The reference part is detected in the initial state and the reference part disappears once due to a gesture.

Condition (B2): The movement region Mb is included in the rectangular region of the reference part when the reference part disappears (first timing).

Condition (B3): The movement region Mb exists in the vicinity of the reference part immediately before the disappearance of the reference part (third timing).

Condition (B4): The movement region Mb exists on the same side as in the condition (B3) and in the vicinity of the reference part immediately after the disappearance of the reference part (fourth timing).

The operation judgment unit 50 receives the movement information Bm(k) and the timing judgment result Dm(k), generates the gesture judgment result Om(k) by using the movement of the barycenter Mg of the movement region Mb included in the movement information Bm(k) and the timing judgment result Dm(k), and outputs the gesture judgment result Om(k).

Specifically, the timing judgment result Dm(k) is detected transition in the order of the states Sp, Sg and Sp (namely, Sp→Sg→Sp) and the gesture based on the positional relationship among the barycenters Mg at the times of the transitions is judged. For example, in cases of judging the series of motions shown in FIG. 5 as the gesture, if the barycenter Mg moving from the region R1 to the region Rc is observed when the timing judgment result Dm(k) shifts from the state Sp to the state Sg and further the barycenter Mg moving from the region Rc to the region Rr is observed when the timing judgment result Dm(k) shifts from the state Sg to the state Sp, the gesture is judged to have been detected and the result of the judgment is outputted.

Similarly, in cases of judging the series of motions shown in FIG. 9 as the gesture, if the barycenter Mg moving from the region R1 to the region Rc is observed when the timing judgment result Dm(k) shifts from the state Sp to the state Sg and further the barycenter Mg moving from the region Rc to the region R1 is observed when the timing judgment result Dm(k) shifts from the state Sg to the state Sp, the gesture is judged to have been detected and the result of the judgment is outputted.

(1-2) Operation

Figure 10:
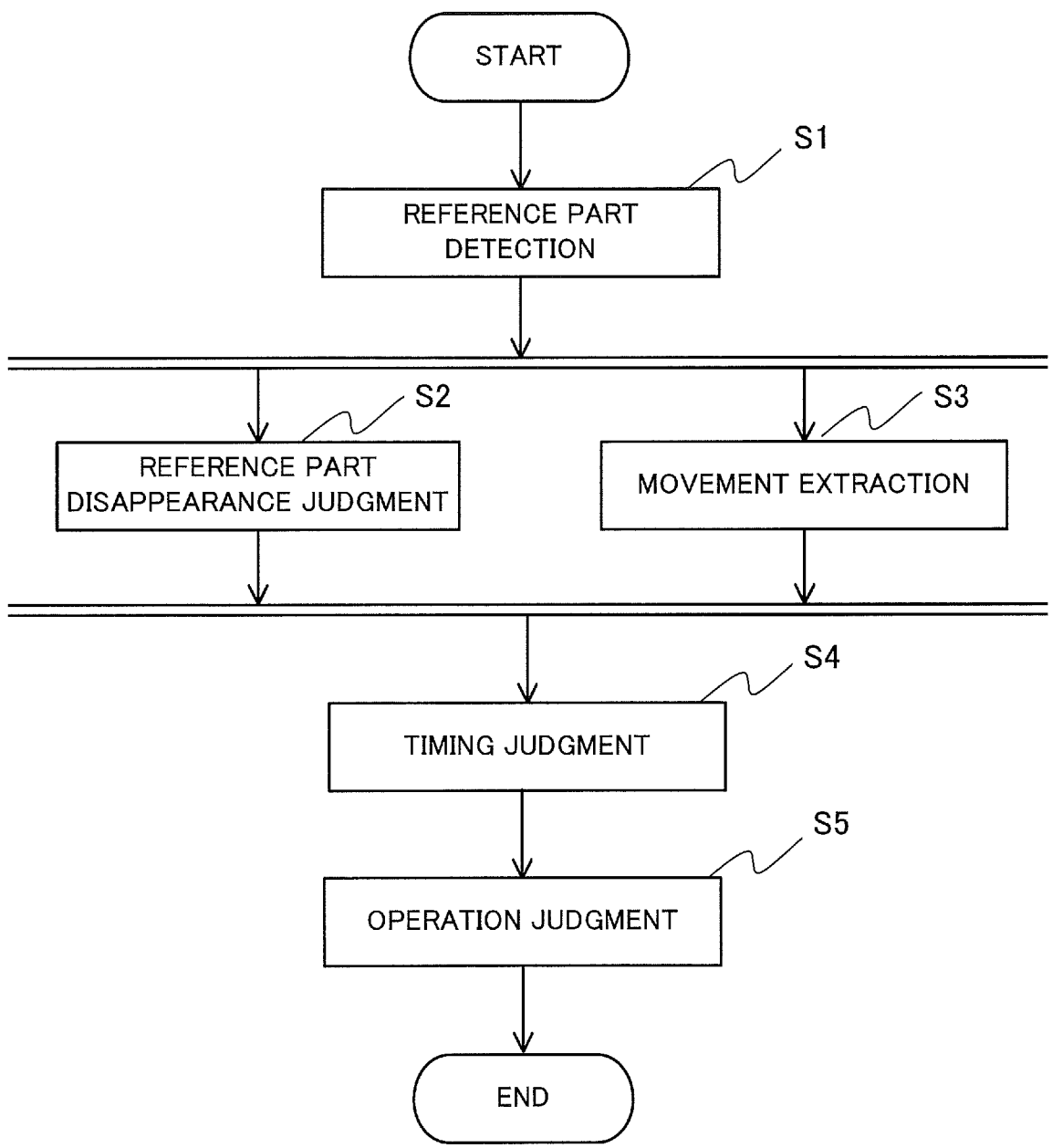
FIG. 10 is a flowchart showing a process performed by the gesture judgment device according to the first embodiment.

Next, a procedure of a process performed by the gesture judgment device 100 according to the first embodiment will be described below with reference to FIG. 10. FIG. 10 is a flowchart showing the process performed by the gesture judgment device 100 according to the first embodiment. The process shown in FIG. 10 is performed every frame period in which a captured image is inputted, namely, performed once in each frame period. First, in step S1, the reference part detection unit 10 generates the reference part information Am(k) by detecting at least one predetermined part of the operator as the reference (reference part) in the image data Im(k) provided as the input.

Subsequently, in step S2, the movement extraction unit 20 receives the reference part information Am(k) and the latest image data Im(k), extracts a region in the vicinity of the reference part, where movement between frames occurred, from the latest image data Im(k) and at least one piece of image data Im(k−α) among the image data having frame numbers different from that of Im(k), and thereby generates the movement information Bm(k).

In step S3, the reference part disappearance judgment unit 30 receives the image data. Im(k) and the reference part information Am(k), judges the disappearance of the reference part in the image data Im(k) by making a comparison with past reference part information Am(k−α), and thereby generates the reference part disappearance judgment result Cm(k). The processing of the step S2 and the processing of the step S3 are performed in parallel.

Subsequently, in step S4, the timing judgment unit 40 receives the reference part information Am(k), the movement information Bm(k) and the reference part disappearance judgment result Cm(k), judges whether the movement information Bm(k) was caused by a gesture by the operator or a different phenomenon (a change in the background and an unintended motion by the operator), and thereby generates the timing judgment result Dm(k).

Finally, in step S5, the operation judgment unit 50 receives the timing judgment result Dm(k), makes the gesture judgment based on Dm(k) and at least one past timing judgment result Dm(k−α), and thereby generates and outputs the gesture judgment result Om(k).

(1-3) Effect

As described above, with the gesture judgment device 100 according to the first embodiment, the gesture is judged based on the position and the timing of appearance of the movement region in the image caused by the gesture operation and the timing of disappearance of the reference part of a person from the captured image due to the gesture operation. In other words, the gesture judgment device 100 according to the first embodiment judges whether the first timing of the occurrence of a frame image in which the reference part is not detected, indicated by the reference part disappearance information, and the second timing of the occurrence of a frame in which the movement region indicated by the movement information and the reference part region indicated by the reference part information overlap with each other are synchronized with each other or not and judges the contents of the gesture operation performed by the operator based on the timing judgment result that is the result of the judging and the movement information. Accordingly, the gesture judgment can be made with high accuracy even when the operator performs a short-duration gesture operation (e.g., the operation of swiping a hand) without continuing a predetermined motion for a predetermined period.

Further, with the gesture judgment device 100 according to the first embodiment, by setting the reference part as the operator's face, the operator is enabled to perform an appropriate gesture operation by making a motion of moving a hand to cross a position in front of the camera (position between the operator's face and the camera). Thus, the operator can easily grasp the reference of the gesture operation (just moving a hand to cross the position in front of his/her own face works) and the gesture operation by the operator is facilitated.

(1-4) Modifications

While the operator's face is used as the reference part in the first embodiment, the reference part is not limited to this example: a different body part of the operator, such as an eye, nose, mouth, neck, shoulder, or the like, can also be used as the reference part. For the detection of such a part other than the face, it is possible to use a cascade detector similarly to the case of face detection, or to use a publicly known technology such as AAM (Active Appearance Model).

While the reference part is set as a part (face) of the operator in the first embodiment, the reference part is not limited to this example: the reference part does not have to be a part belonging to the operator. For example, in a case where the operator is sitting on a chair, it is possible to set the reference part as a part of the chair such as an armrest, or an illuminator or a part of a wall in a space where the operator exists. However, from the viewpoint of accurately detecting the gesture, it is desirable to set the reference part as a part situated at a position where the part does not disappear from the image due to a motion other than the gesture. Further, it is desirable to set the reference part as a part existing between the operator and the camera.

While one reference part (the operator's face) is set in the first embodiment, the setting of the reference part is not limited to this example. For example, it is possible to detect a plurality of reference parts and make the judgment on whether the extracted movement information was caused by the gesture operation or not by using the reference part disappearance judgment result in regard to the disappearance timing of each of the plurality of detected reference parts. This makes it possible to make the gesture judgment with still higher accuracy. It is also possible to make the judgment on whether the extracted movement information was caused by the gesture operation or not based on the order of the disappearance timing of the plurality of reference parts. Also in this case, high-accuracy gesture judgment becomes possible.

While the texture information is used for the movement extraction in the first embodiment, the movement extraction is not limited to this example; the movement extraction may be carried out by calculating a luminance value difference between frames, or by employing a statistical background difference technique using histograms of red, green and blue (RGB) pixel values and the luminance value. It is also possible to extract the movement by detecting a hand with a detection means such as a cascade detector similarly to the face detection and tracking the detected hand. A publicly known technique such as a Kalman filter or a particle filter can be used as a method for tracking the detected hand.

While a motion like moving a hand in front of the face to cross the face is used as the target motion of the gesture judgment in the first embodiment, the motion as the target operation is not limited to this example; any motion is usable as long as a predetermined reference part disappears along with movement of a hand. For example, an operation of moving a hand in front of the face to cross the face up to down or repeatedly waving a hand left and right in front of the face to cross the face can be used as the gesture as the target of the judgment.

While the movement information Bm(k) is assumed to include the barycenter data of the region having major movement in the first embodiment, the movement information Bm(k) is not limited to this example; central point data of the region having major movement may be used, for example.

While the region having major movement is divided into groups and a region including a great number of blocks connected together is specified as the movement region in the first embodiment, the movement region is not limited to this example. For example, the movement region may also be specified as a region surrounded by blocks connected together and having the greatest area among such surrounded regions, or a region having the greatest total value of the change amount dTF calculated for each block included in the blocks connected together.

While the movement extraction is performed on the whole of the image data Im(k) in the first embodiment, it is also possible to set a region in the vicinity of the detected reference part as a movement extraction target region and perform the movement extraction within the range of the movement extraction target region that has been set. By setting the movement extraction target region as above, the calculation cost necessary for the calculation of the CSLBP feature can be reduced.

While the movement extraction unit 20 selects one group from the groups in the region having major movement and thereby generates the movement information Bm(k) in the first embodiment, the movement information Bm(k) is not limited to this example. For example, the movement information Bm(k) may include information on two or more of the groups. In such cases, which group should be selected and used out of the groups has to be determined by the timing judgment unit 40. When the group is selected by the timing judgment unit 40, a group having the largest size or a group closest to the reference part or disappeared reference part is selected, for example.

(2) Second Embodiment (2-1) Configuration

Figure 11:
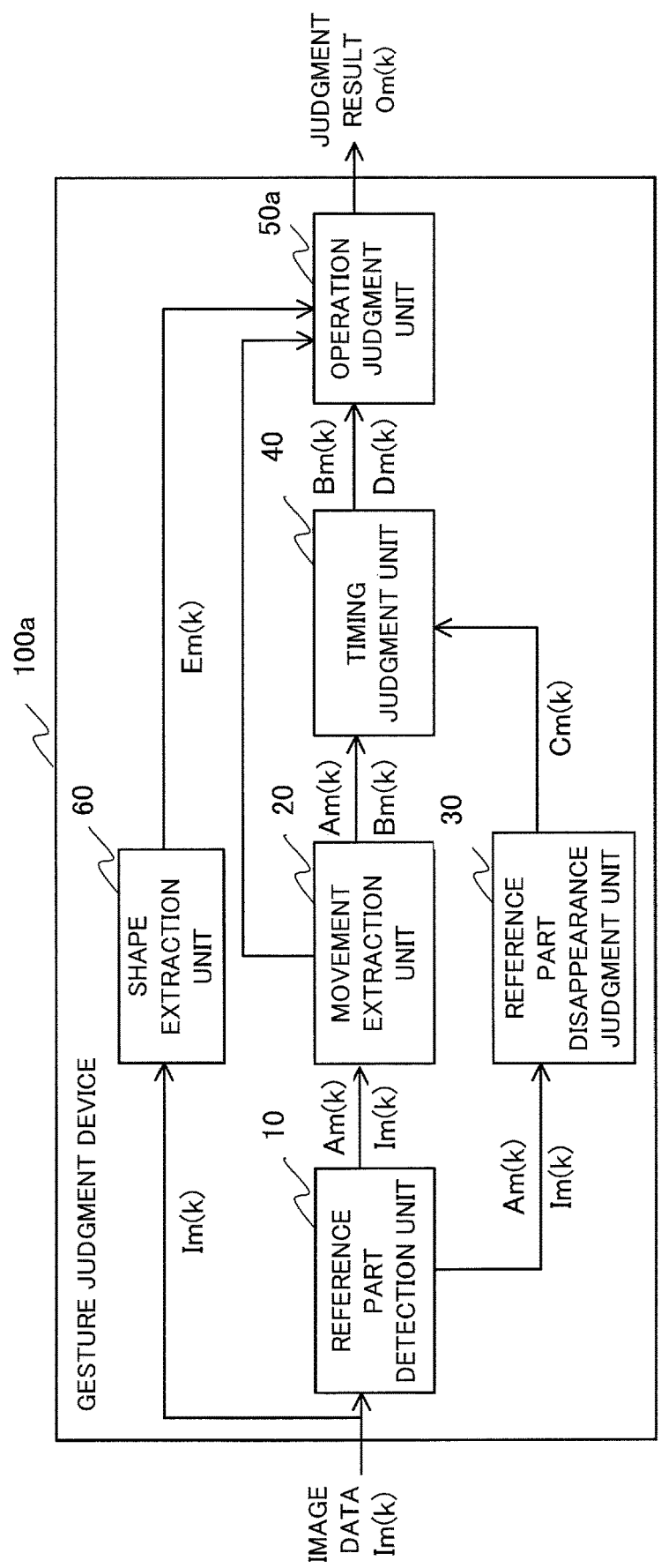
FIG. 11 is a block diagram showing a general configuration of a gesture judgment device according to a second embodiment of the present invention.

FIG. 11 is a block diagram showing the general configuration of a gesture judgment device 100a according to a second embodiment of the present invention. The gesture judgment device 100a shown in FIG. 11, which is substantially the same as the gesture judgment device 100 shown in FIG. 1, differs from the gesture judgment device 100 in including a shape extraction unit 60 and an operation judgment unit 50a. In FIG. 11, each component identical or corresponding to a component shown in FIG. 1 is assigned the same reference character as in FIG. 1. Further, description will be omitted for components identical or corresponding to those shown in FIG. 1.

The second embodiment differs from the first embodiment in that the gesture judgment is not limited to a gesture performed by means of a motion like the hand waving motion, the shape extraction unit 60 performs shape extraction on a gesture presenting a specified hand shape like sending a signal, and the operation judgment unit 50a outputs the gesture judgment result Om(k) based on a hand shape extraction result Em(k) obtained by the shape extraction unit 60 and the timing judgment result Dm(k) obtained by the timing judgment unit 40.

Figures 12A, 12B, 12C:
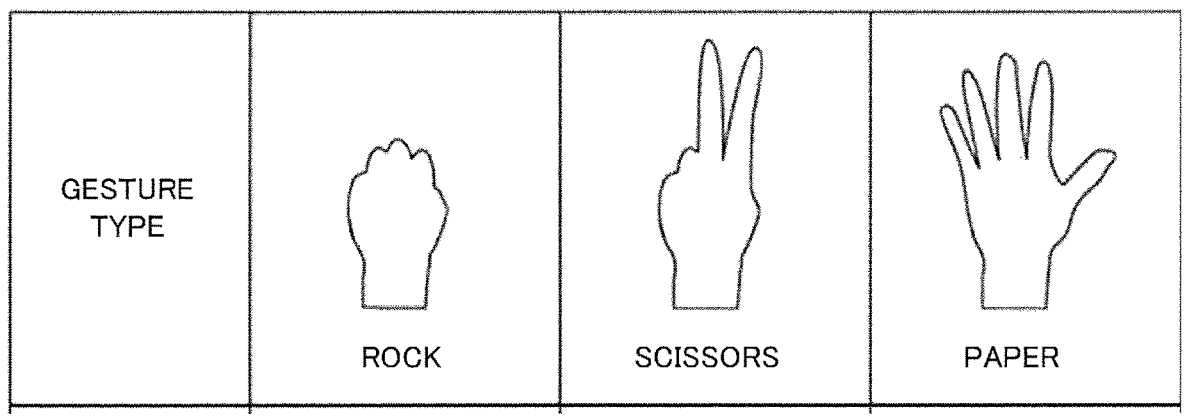
FIGS. 12(a) to 12(c) are diagrams showing types of hand shapes in the second embodiment.

First, the shape extraction unit 60 receives the image data Im(k) as the input, detects a hand included in the image data Im(k), and outputs the hand shape extraction result Em(k). FIGS. 12(a) to 12(c) are diagrams showing types of hand shapes that are famed with a hand in the second embodiment. FIG. 12(a) shows a case where the hand shape is a rock, FIG. 12(b) shows a case where the hand shape is scissors, and FIG. 12(c) shows a case where the hand shape is paper. Hand shapes extracted by the shape extraction unit 60 are predetermined hand shapes; the types shown in FIG. 12 (rock, scissors, paper) can be given as an example. In the following description, the hand shapes shown in FIG. 12 are assumed to be the types of the extracted hand shape.

The hand shape extraction result Em(k) includes information on the presence/absence of hand detection indicating whether a hand was detected in the image data Im(k) or not, information on the type of the extracted hand shape, information on the central coordinates and the size of the detected hand, and so forth. In regard to the presence/absence of hand detection, a value of 1 is outputted when a hand was detected or a value of 0 is outputted when no hand was detected, for example. In regard to the type of the hand shape, for the hand shapes in the game of rock, paper and scissors, for example, a value of 1 is outputted when the hand shape is the rock (rock shape), a value of 2 is outputted when the hand shape is the scissors (scissors shape), a value of 3 is outputted when the hand shape is the paper (paper shape), and a value of 0 is outputted when the hand shape is not a predetermined hand shape. A region of the detected hand is represented by a rectangular region, for example, central coordinates Hc (Hcx, Hcy) of the rectangular region are outputted as the central coordinates of the hand, and the width Hw and the height Hh of the rectangular region are outputted as the size.

The operation judgment unit 50a receives the hand shape extraction result Em(k), the movement information Bm(k) and the timing judgment result Dm(k) and outputs the gesture judgment result Om(k).

(2-2) Operation

Next, the operation of the gesture judgment device 100a according to the second embodiment will be described below. First, the operation of the shape extraction unit 60 will be described. The shape extraction unit 60 is capable of detecting a hand included in the image data Im(k) and extracting a predetermined hand shape by using publicly known technology. For the hand detection, a cascade-type hand detector like the detector used for the face detection is used, for example. For the hand shape extraction, the CSLBP feature values are calculated for the rectangular region of the hand detected by the hand detector and the shape is extracted by means of SVM (Support Vector Machine), for example. The shape extraction unit 60 outputs the hand shape extraction result Em(k) obtained by the extraction to the operation judgment unit 50*a*.

Next, a motion of the operation judgment unit 50*a* will be described. The operation judgment unit 50*a* outputs a gesture judgment result by means of hand movement or a gesture judgment result by means of hand shape presentation as the gesture judgment result Om(k). The gesture judgment result by means of hand movement is generated and outputted based on the timing judgment result Dm(k). The gesture judgment result by means of hand shape presentation is generated and outputted based on the result of analyzing movement velocity of the movement region in the image, determined from the movement information Bm(k), and the hand shape extraction result Em(k) for a plurality of frames.

The gesture judgment by means of hand movement is made in the same way as in the first embodiment. For the gesture judgment by means of hand shape presentation, the operation judgment unit 50*a* has counters, for counting information regarding a hand shape extracted in the most recent frame, in regard to each of the gesture types shown in FIG. 12 and increments, decrements or resets the counters depending on the hand shape extraction result Em(k) and the movement velocity of the movement region in the captured image determined from the movement information Bm(k). When the counter reaches a certain value, it is judged as a gesture as presentation of a hand shape.

First, the movement velocity V(k) of the movement region in the captured image is calculated from the movement information Bm(k) of the current frame and the movement information Bm(k−$\alpha$) of a past frame. In this example, it is assumed that $\alpha$=1 for simplicity of explanation. For example, the movement velocity V(k) is calculated by using the Euclidean distance between the barycenter Mg(k) included in the movement information Bm(k) and the barycenter Mg(k−1) included in the movement information Bm(k−1).

Next, conditions for the incrementing, decrementing and resetting of the counters will be described below. In regard to the increment, when the movement velocity V(k) of the movement region (movement evaluation value) is lower than a predetermined threshold value Vh and a predetermined type of gesture has been extracted in the hand shape extraction result Em(k), the counter of the relevant type of gesture is incremented. In this case, counters of irrelevant types of gestures are decremented. The decrement is carried out when an aforementioned condition is satisfied or the movement velocity V(k) is higher than or equal to the predetermined threshold value Vh.

Incidentally, a maximum value at the time of increment is set at CMax and the increment is not carried out when the counter exceeds the maximum value. Further, a minimum value at the time of decrement is set at 0, for example, and the decrement is not carried out when the counter falls below the minimum value. When a gesture by means of hand movement is detected, resetting the counter is carried out for all the counters, by setting the counters at 0 as the counter minimum value, for example.

As for the timing of the gesture judgment by means of hand shape presentation, at the time when a counter corresponding to one of the gestures shown in FIG. 12 exceeds a threshold value Cth, it is judged that the gesture has been detected and the judgment result is outputted. Incidentally, the threshold value Cth is set at a value lower than the maximum value CMax.

(2-3) Effect

With the gesture judgment device 100*a* according to the second embodiment, effects similar to those of the gesture judgment device 100 according to the first embodiment can be achieved.

With the gesture judgment device 100*a* according to the second embodiment, the gesture judgment by means of hand shape presentation is carried out by using the gesture judgment result Om(k) by means of hand movement generated based on the hand shape extraction result Em(k) as the result of the extraction by the shape extraction unit 60 and the timing judgment result Dm(k) as the result of the judgment by the timing judgment unit 40. Accordingly, gesture judgment with less misjudgment becomes possible.

With the gesture judgment device 100*a* according to the second embodiment, the movement evaluation value (described in the second embodiment as the movement velocity V(k) of the movement region) is calculated from the movement feature, and the gesture judgment by means of hand shape presentation is not carried out when the movement evaluation value is greater than the predetermined threshold value (the gesture judgment by means of hand shape presentation is carried out when the movement evaluation value is less than or equal to the predetermined threshold value). Accordingly, gesture judgment with less misjudgment becomes possible.

(2-4) Modifications

While the movement velocity of the movement region is used as the movement evaluation value in the second embodiment, the movement evaluation value is not limited to this example; it is also possible to use the size of the movement region as the movement evaluation value, for example.

While the shape extraction is performed on the whole of the image data Im(k) in the second embodiment, the method of the shape extraction is not limited to this example. For example, it is also possible to input the reference part information Am(k) to the shape extraction unit 60 and make the shape extraction unit 60 set a region in the vicinity of the reference part as a shape extraction target region and perform the shape extraction in the shape extraction target region that has been set. By limiting the target region of the shape extraction as above, the processing cost can be reduced.

While the gesture judgment by means of hand shape presentation is not carried out when the movement evaluation value is greater than the predetermined threshold value in the second embodiment, it is also possible to determine whether to perform the shape extraction or not depending on the movement evaluation value. That way, the processing cost can be reduced since the processing for the shape extraction can become unnecessary.

While the shape extraction unit 60 detects one hand and extracts the shape of the hand in the second embodiment, the shape extraction unit 60 may also be configured to detect a plurality of hands and generate the hand shape extraction result Em(k) to include the result of the judgment on the type of the hand shape in regard to each of the detected hands.

While the control of the counters in the gesture judgment by means of hand shape presentation is performed based on the movement velocity V(k) of the movement region in the second embodiment, the counter control is not limited to this example. For example, the counter control may be performed by tracking the region of the hand detected by the shape extraction unit 60 and calculating the movement velocity of the hand region.

(3) Third Embodiment (3-1) Configuration

Figure 13:
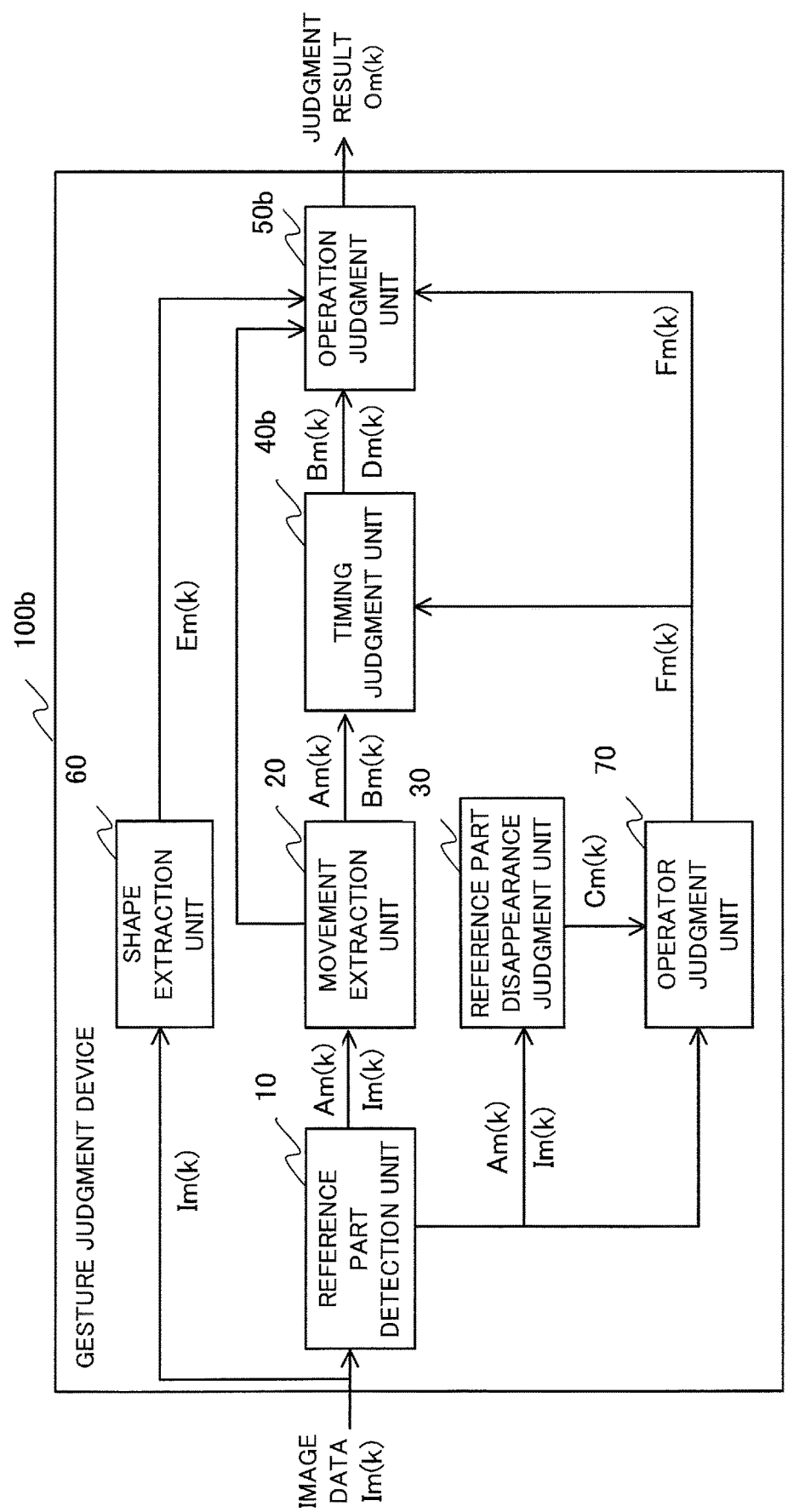
FIG. 13 is a block diagram showing a general configuration of a gesture judgment device according to a third embodiment of the present invention.

FIG. 13 is a block diagram showing the general configuration of a gesture judgment device 100b according to a third embodiment of the present invention. As shown in FIG. 13, the gesture judgment device 100b according to the third embodiment, which is substantially the same as the gesture judgment device 100a shown in FIG. 11, differs from the gesture judgment device 100a in including a timing judgment unit 40b, an operation judgment unit 50b and an operator judgment unit 70. In FIG. 13, each component identical or corresponding to a component shown in FIG. 11 is assigned the same reference character as in FIG. 11. Further, description will be omitted for components identical or corresponding to those shown in FIG. 11.

The third embodiment differs from the second embodiment in that an operator judgment result Fm(k) is obtained by judging which person is the operator based on the reference part information Am(k) and the reference part disappearance judgment result Cm(k), and the gesture judgment result is outputted based on the movement information Bm(k), the shape extraction result Em(k), the timing judgment result Dm(k) and the operator judgment result Fm(k).

The operator judgment unit 70 is provided with the reference part information Am(k) and the reference part disappearance judgment result Cm(k) as inputs, thereby judges which person is the operator, and outputs the operator judgment result Fm(k) to the operation judgment unit 50b. The operator judgment result Fm(k) includes individual information on the operator including a label specifying the operator and positional information on the operator, the position of the reference part, and the disappearance judgment result in regard to each reference part.

The label is determined based on the position of the operator in the image data Im(k), for example. The following explanation will be given under a condition that there are two operators, wherein the label of the operator on the left-hand side of the captured image is assumed to be L and the label of the operator on the right-hand side of the captured image is assumed to be R. The positional information on the operator is obtained based on the position of the reference part, and in cases where the reference part is a face region, central coordinates of the face region are obtained as the positional information, for example.

The timing judgment unit 40b is provided with the movement information Bm(k) and the operator judgment result Fm(k) as inputs, judges in regard to each operator whether the movement information Bm(k) was caused by a gesture by the operator or a different phenomenon, and thereby outputs the timing judgment result Dm(k).

The operation judgment unit 50b outputs the gesture judgment result Om(k) based on the movement information Bm(k), the hand shape extraction result Em(k), the timing judgment result Dm(k) and the operator judgment result Fm(k). The operation judgment unit 50b judges which operator performed the gesture based on the operator judgment result Fm(k), adds the label of the operator to the judgment result of the type of the gesture, and outputs the result as the gesture judgment result Om(k).

(3-2) Operation

Next, the operation of each component will be described below. The operator judgment unit 70 assigns the label to an operator to which a reference part belongs based on the coordinate information on the reference part detected by the reference part detection unit 10 or the coordinate information on the disappeared reference part detected by the reference part disappearance judgment unit 30. For example, the operator is labeled with "L" when the reference part was detected on the side to the left of the center of the captured image. In contrast, the operator is labeled with "R" when the reference part was detected on the side to the right of the center of the captured image.

The timing judgment unit 40 keeps track of state transitions like those shown in FIG. 7 in regard to each operator and judges in regard to each operator whether the movement information Bm(k) was caused by a gesture by the operator or a different phenomenon. For information on each of a plurality of movement regions included in the movement information Bm(k), a judgment is made on which operator is the operator to which the information belongs based on the positional information on the operator included in the operator judgment result Fm(k), and the result of the judgment is used for the state transition of the pertinent operator. The timing judgment unit 40b outputs label information on an operator indicating that a timing signal is a signal regarding the operator, together with the signal regarding the state transition, to the operation judgment unit 50b as the timing judgment result Dm(k).

The judgment on which operator is the operator to which the movement information Bm(k) belongs is made based on the distance between the barycenter of the movement region and the position of each operator, for example. Distances between the barycenter position of a certain movement region and all the operators are calculated and the movement information Bm(k) is judged to belong to the operator at the shortest distance. When there are a plurality of movement regions belonging to one operator, one of the movement regions is selected and used, for example.

The operation judgment unit 50b generates and outputs the gesture judgment result Om(k) based on the timing judgment result Dm(k) supplied in regard to each operator, the hand shape extraction result Em(k), and the operator judgment result Fm(k). The operation judgment unit 50b has the counters corresponding to the gesture types shown in FIG. 12 in regard to each operator. Based on hand position information included in the hand shape extraction result Em(k) and the position of each operator, to which operator the extracted hand belongs is judged, and the incrementing, decrementing and resetting of the counters of each operator is carried out accordingly. Then, the gesture judgment result Om(k) is generated in regard to each operator based on the timing judgment result in regard to each operator and the state of the counters of each operator. The generated gesture judgment result Om(k) is outputted together with the label of the operator.

(3-3) Effect

With the gesture judgment device 100b according to the third embodiment, effects similar to those of the gesture judgment device 100 according to the first embodiment and the gesture judgment device 100a according to the second embodiment can be achieved.

With the gesture judgment device 100b according to the third embodiment, thanks to the operator judgment unit 70, the gesture judgment is carried out while associating the reference part with the individual information (e.g., positional information) on an operator. Accordingly, it becomes possible to make the gesture judgment with high accuracy even when a plurality of operators exist in the captured image.

(3-4) Modification

While the third embodiment has been described above while taking a case where the number of operators is two as an example, the third embodiment is not limited to this example. For example, in cases of operating equipment for digital signage or the like in a public facility or a factory by means of gesture operation, there can be an indefinite number of operators. In such cases, the operator labeling is carried out for each face region detected in the image data and the judgment on gesture operation is made in regard to each operator, for example.

(3-5) Modification

In the third embodiment, the timing judgment unit 40b may determine the operator label information based on the operator to which the reference part belongs, based on the operator to which the movement information belongs, or based on both of them.

For instance, an example of determining the operator label information based on the operator to which the reference part belongs will be explained below. When the reference part of an operator on the left-hand side of the captured image is judged to be movement information caused by a gesture operation based on a motion of an operator on the right-hand side of the captured image, the operator label information is determined assuming that the operator on the left-hand side of the captured image, to which the reference part belongs, performed the operation. Namely, the label is determined as "L".

Next, an example of determining the operator label information based on the operator to which the movement information belongs will be explained below. When the reference part of an operator on the left-hand side of the captured image is judged to be movement information caused by a gesture operation based on a motion of an operator on the right-hand side of the captured image, the operator label information is determined assuming that the operator on the right-hand side of the captured image, to which the movement information belongs, performed the operation. Namely, the label is determined as "R".

(4) Fourth Embodiment (4-1) Configuration

Figure 14:
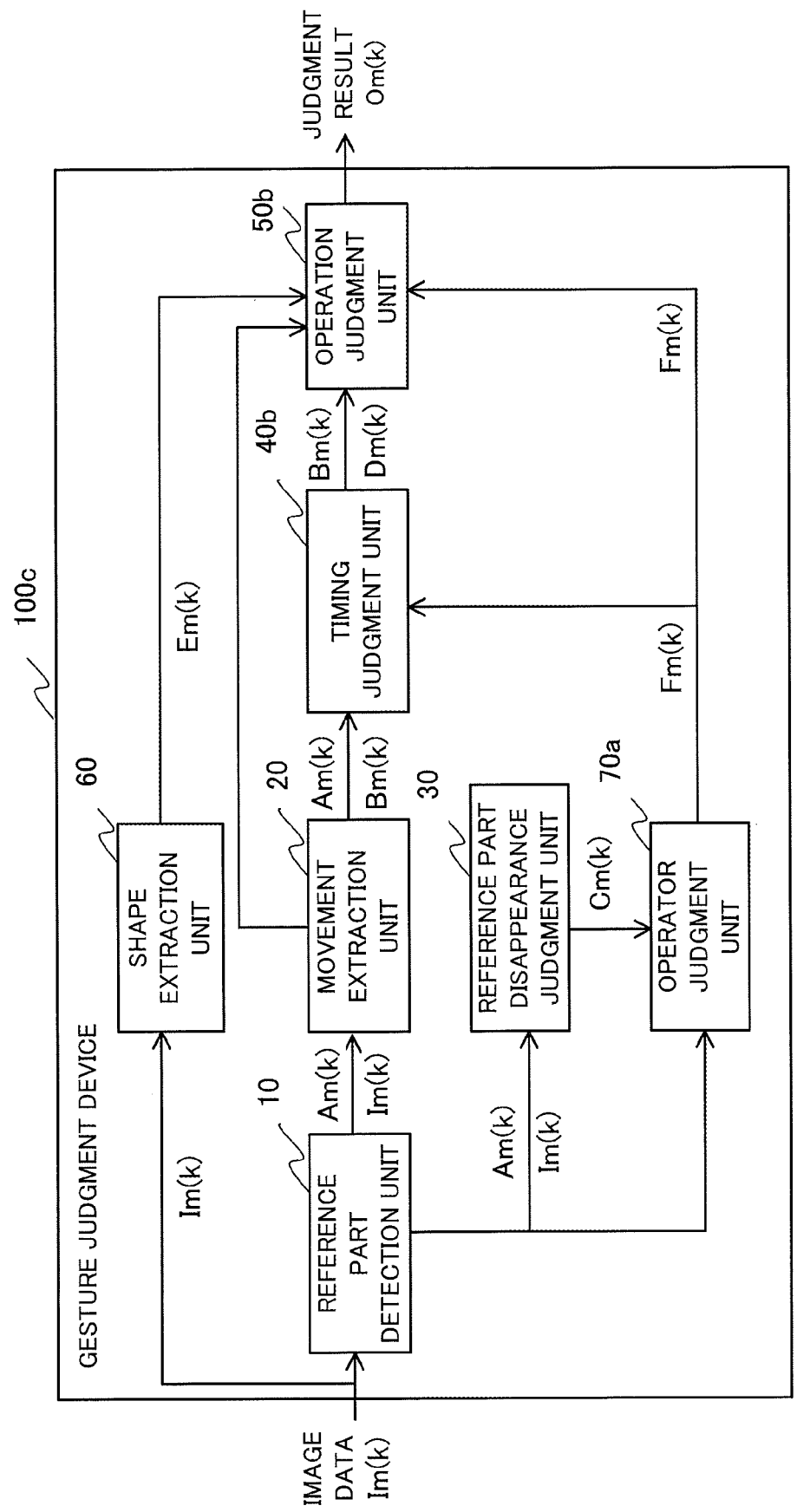
FIG. 14 is a block diagram showing a general configuration of a gesture judgment device according to a fourth embodiment of the present invention.

FIG. 14 is a block diagram showing the general configuration of a gesture judgment device 100c according to a fourth embodiment of the present invention. As shown in FIG. 14, the gesture judgment device 100c according to the fourth embodiment, which is substantially the same as the gesture judgment device 100b shown in FIG. 13, differs from the gesture judgment device 100b in including an operator judgment unit 70a. In FIG. 14, each component identical or corresponding to a component shown in FIG. 13 is assigned the same reference character as in FIG. 13. Further, description will be omitted for components identical or corresponding to those shown in FIG. 13.

The difference from the third embodiment is that the operator judgment unit 70a is provided with an authentication result Id and the operator judgment unit 70a outputs an Id, obtained by incorporating the authentication result into the operator judgment result Fm(k), as a label. The authentication result Id is individual information on an operator specifying who is the operator, including face authentication information on the operator, an authentication number of the operator, and positional information in the captured image, for example.

The operator judgment unit 70a is provided with the reference part information Am(k), the reference part disappearance judgment result Cm(k) and the authentication result Id as inputs, and outputs the operator judgment result Fm(k). The operator judgment unit 70a judges to which operator the detected reference part and the disappeared reference part belong based on the positional information in the authentication result Id and outputs the operator judgment result Fm(k) including the authentication number of the operator as a label.

The operation judgment unit 50b generates and outputs the gesture judgment result Om(k) based on the timing judgment result Dm(k) supplied in regard to each operator, the shape extraction result Em(k), and the operator judgment result Fm(k).

(4-2) Effect

With the gesture judgment device 100c according to the fourth embodiment, effects similar to those of the gesture judgment devices 100, 100a and 100b according to the first to third embodiments can be achieved.

With the gesture judgment device 100c according to the fourth embodiment, the operator judgment unit 70a is provided and the gesture judgment is carried out while associating the reference part with the individual information (e.g., face authentication information) on an operator. Accordingly, it becomes possible to make the gesture judgment with high accuracy even when a plurality of operators exist in the captured image.

(4-3) Modification

In the fourth embodiment, similarly to the third embodiment, the timing judgment unit 40b may determine the operator label information based on the operator to which the reference part belongs, based on the operator to which the movement information belongs, or based on both of them.

(5) Fifth Embodiment (5-1) Configuration

Figure 15:
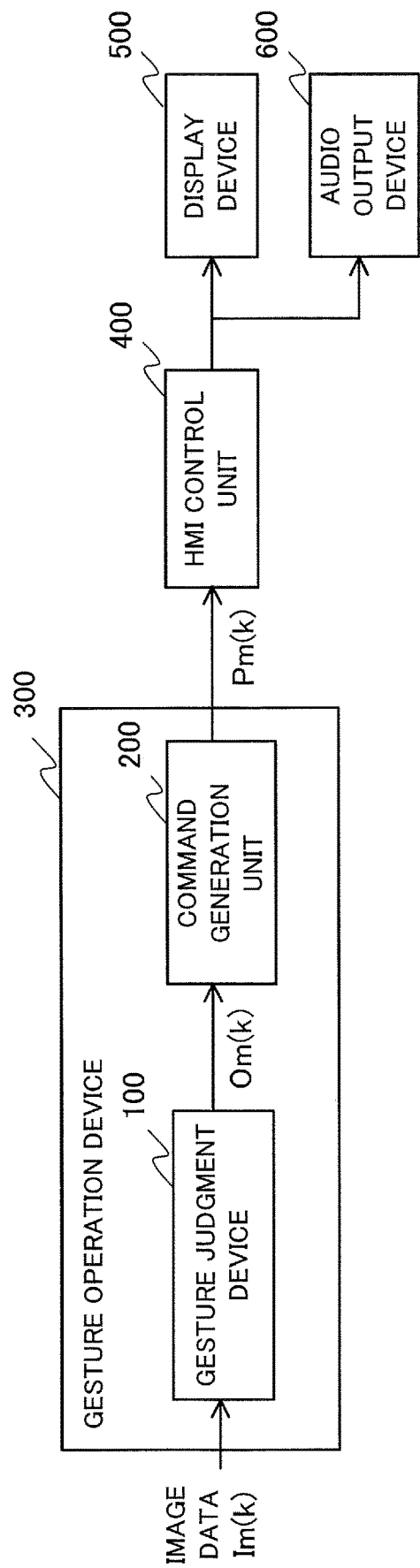
FIG. 15 is a block diagram showing a general configuration of a gesture operation device according to a fifth embodiment of the present invention.

FIG. 15 is a block diagram showing the general configuration of a gesture operation device 300 according to a fifth embodiment of the present invention. As shown in FIG. 15, the gesture operation device 300 according to the fifth embodiment includes the gesture judgment device 100 and a command generation unit 200.

The gesture judgment device 100 receives the image data Im(k) from the outside and outputs the gesture judgment result Om(k) by analyzing the image data Im(k) and judging the gesture of the operator. The command generation unit 200 generates an operation command Pm(k) for operating equipment based on the gesture judgment result Om(k) and outputs the operation command Pm(k) to an external HMI (Human Machine Interface) control unit 400. The HMI control unit 400 controls a display device 500 and an audio output device 600 based on the operation command Pm(k). The operation command Pm(k) is an input command for controlling HMI in regard to menu switching, song skipping, rewinding, etc., for example.

(5-2) Effect

With the gesture operation device 300 according to the fifth embodiment, the gesture is judged based on the position and the appearance timing of the movement region in the image caused by the gesture operation and the timing of disappearance of the reference part of a person from the captured image due to the gesture operation, and the operation/control of the equipment is carried out based on the gesture judgment. Accordingly, a short-duration gesture operation can be judged with high accuracy and a corresponding operation command for the equipment can be generated without the need of requiring the operator to continue a predetermined motion for a predetermined period. Thus, it is possible to provide a gesture operation device 300 capable of high-accuracy gesture operation even when the operator performs a short-duration gesture operation.

(6) Sixth Embodiment (6-1) Configuration

Figure 16:
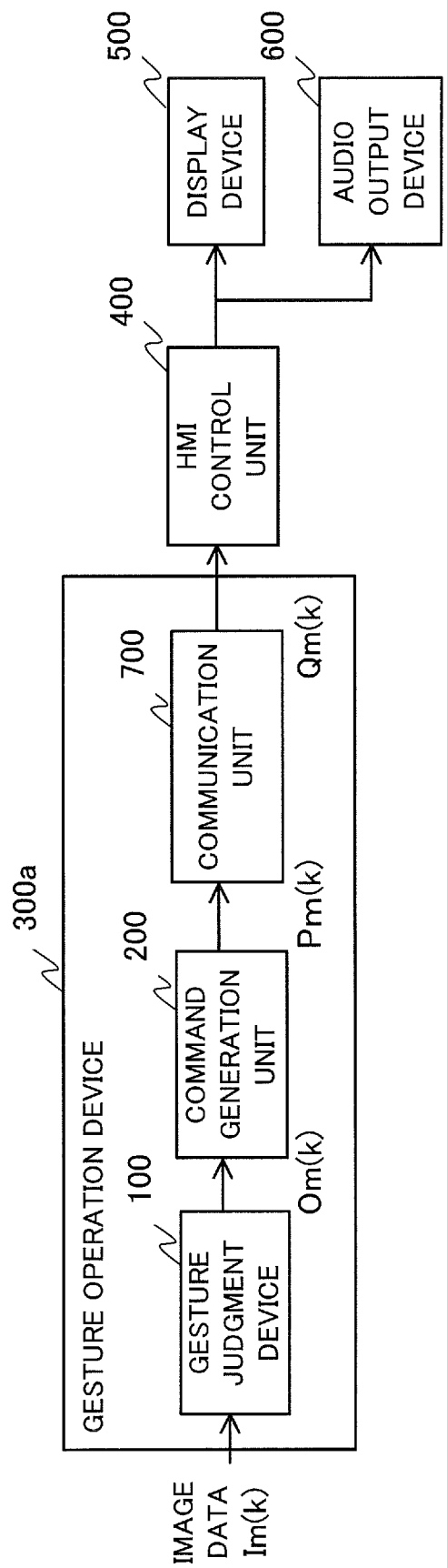
FIG. 16 is a block diagram showing a general configuration of a gesture operation device according to a sixth embodiment of the present invention.

FIG. 16 is a block diagram showing the general configuration of a gesture operation device 300a according to a sixth embodiment of the present invention. The gesture operation device 300a according to the sixth embodiment, which is substantially the same as the gesture operation device 300 shown in FIG. 15, differs from the gesture operation device 300 shown in FIG. 15 in including a communication unit 700. In FIG. 16, each component identical or corresponding to a component shown in FIG. 15 is assigned the same reference character as in FIG. 15. Further, description will be omitted for components identical or corresponding to those shown in FIG. 15.

The communication unit 700 receives the operation command Pm(k) inputted from the command generation unit 200, converts the operation command Pm(k) into a communication signal Qm(k), and outputs the communication signal Qm(k) to external equipment. The communication signal Qm(k) can be a type of signal selected from an infrared remote control signal, a radio communication signal, an optical communication signal, an electric signal and a CAN (Controller Area Network) communication signal, for example.

(6-2) Effect

With the gesture operation device 300a according to the sixth embodiment, effects similar to those of the gesture operation device 300 according to the fifth embodiment can be achieved.

With the gesture operation device 300a according to the sixth embodiment, thanks to the communication unit 700, the generated operation command Pm(k) can be converted into the communication signal Qm(k) and outputted, and thus the operator is enabled to operate multiple pieces of equipment by use of one gesture operation device 300a.

(7) Modifications

Figure 17:
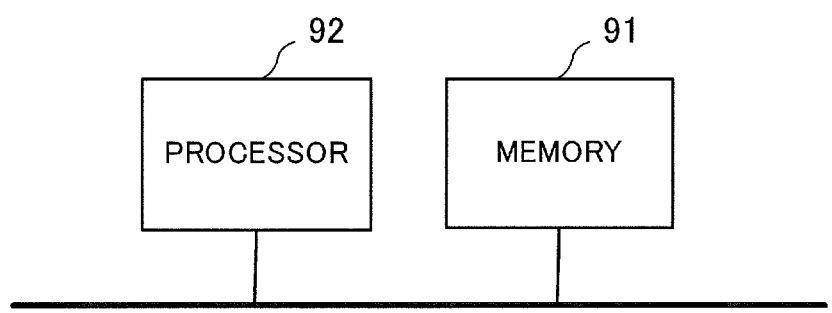
FIG. 17 is a diagram showing a configuration of a control unit in a modification.

FIG. 17 is a hardware configuration diagram showing the configuration of a modification of the gesture judgment devices 100, 100a, 100b and 100c according to the first to fourth embodiments. The gesture judgment device shown in FIG. 17 can be a program execution unit (e.g., computer) including a memory 91 as a storage device for storing a program as software and a processor 92 as an information processing unit for executing the program stored in the memory 91. The gesture judgment device shown in FIG. 17 can also be formed with a semiconductor integrated circuit. Further, the gesture judgment device shown in FIG. 17 can also be formed with a combination of a program execution unit and a semiconductor integrated circuit.

DESCRIPTION OF REFERENCE CHARACTERS 100, 100a, 100b, 100c: gesture judgment device, 10: reference part detection unit, 20: movement extraction unit, 30: reference part disappearance judgment unit, 40: timing judgment unit, 50, 50a, 50b: operation judgment unit, 60: shape extraction unit, 70, 70a: operator judgment unit, 200: command generation unit, 300, 300a: gesture operation device, 400: HMI control unit, 500: display device, 600: audio output device, 700: communication unit, Am(k): reference part information, Bm(k): movement information, Cm(k): reference part disappearance judgment result (reference part disappearance information), Dm(k): timing judgment result, Im(k): image data, Om(k): gesture judgment result, Mg(k): barycenter of movement region, Em(k): shape extraction result, Fm(k): operator judgment result, Pm(k): operation command, Qm(k): communication signal.

What is claimed is:

1. A gesture judgment device for judging contents of a gesture operation performed by an operator, comprising:
    a reference part detection unit to detect a reference part in a plurality of frame images successively acquired as captured images and to output reference part information indicating a reference part region where the reference part exists in regard to each of the plurality of frame images;
    a movement extraction unit to extract movement between frame images in the plurality of frame images and to output movement information indicating a movement region where the movement occurred;
    a reference part disappearance judgment unit to generate reference part disappearance information, indicating first timing of occurrence of a frame image in which the reference part is not detected, based on a result of the detecting indicated by the reference part information;
    a timing judgment unit to judge whether the first timing indicated by the reference part disappearance information and second timing of occurrence of a frame in which the movement region indicated by the movement information and the reference part region indicated by the reference part information overlap with each other are synchronized with each other or not and to output a timing judgment result that is a result of the judging; and
    an operation judgment unit to judge the contents of the gesture operation based on the timing judgment result and the movement information.

2. The gesture judgment device according to claim 1, wherein the operation judgment unit to judge that the movement information was caused by the gesture operation performed by the operator if the movement region was detected on a first side of the reference part region with third timing before the first timing and the movement region was detected on a second side of the reference part region opposite to the first side with fourth timing after the first timing.

3. The gesture judgment device according to claim 1, wherein the operation judgment unit to judge that the movement information was caused by the gesture operation performed by the operator if the movement region was detected on a first side of the reference part region with third timing before the first timing and the movement region was detected on the first side of the reference part region with fourth timing after the first timing.

4. The gesture judgment device according to claim 1, wherein the reference part region is a rectangular region.

5. The gesture judgment device according to claim 1, wherein
    the reference part detection unit to detect another reference part other than the reference part and to output other reference part information on the another reference part, the reference part disappearance judgment unit to generate other reference part disappearance information based on a result of the detecting indicated by the other reference part information, the timing judge lent unit to output another timing judgment result based on a result of the judging in regard to the other reference part disappearance information, and the operation judgment unit to judge the contents of the gesture operation performed by the operator based on the another timing judgment result and the movement information.

6. The gesture judgment device according to claim 5, wherein the timing judgment unit to output information regarding order of disappearance of the multiple pieces of reference part information as the timing judgment result.

7. The gesture judgment device according to claim 1, wherein the reference part is operator's face or a part belonging to the face.

8. The gesture judgment device according to claim 1, further comprising a shape extraction unit to extract a shape of a hand region in the captured image and to output a hand shape extraction result that is a result of the extracting, wherein the operation judgment unit to judge the contents of the gesture operation performed by the operator based on the hand shape extraction result, the timing judgment result and the movement information.

9. The gesture judgment device according to claim 8, wherein the operation judgment unit to judge the contents of the gesture operation performed by the operator based on the hand shape extraction result, the timing judgment result and the movement information when a movement evaluation value calculated from the movement information is less than or equal to a predetermined threshold value.

10. The gesture judgment device according to claim 8, wherein the shape extraction unit to perform the extraction of the shape of the hand region in a shape extraction target region that is set with reference to the reference part region.

11. The gesture judgment device according to claim 1, further comprising an operator judgment unit to judge which person in the captured image is the operator based on the reference part information and the reference part disappearance information and to output an operator judgment result that is a result of the judging, wherein the operation judgment unit to judge the contents of the gesture operation performed by the operator based on the operator judgment result, the timing judgment result and the movement information.

12. The gesture judgment device according to claim 11, wherein the operator judgment result includes positional information for specifying a position of the operator.

13. The gesture judgment device according to claim 11, wherein the operator judgment result includes face authentication information on the operator.

14. A gesture operation device comprising:
the gesture judgment device according to claim 1; and
a command generation unit to generate an operation command for operating equipment based on the contents of the gesture operation judged by the operation judgment unit.

15. The gesture operation device according to claim 14, further comprising a communication unit to transmit the operation command to external equipment.

16. A gesture judgment device comprising:
a reference part detection unit to detect a body part of an operator as a reference part in a plurality of frame images successively acquired as captured images and to output reference part information indicating a reference part region where the reference part exists in regard to each of the plurality of frame images;
a movement extraction unit to extract movement between frame images in the plurality of frame images and to output movement information indicating a movement region where the movement occurred;
a reference part disappearance judgment unit to generate reference part disappearance information, indicating first timing of occurrence of a frame image in which the reference part is not detected, based on a result of the detecting indicated by the reference part information;
a timing judgment unit to judge whether the first timing indicated by the reference part disappearance information and second timing of occurrence of a frame in which the movement region indicated by the movement information and the reference part region indicated by the reference part information overlap with each other are synchronized with each other or not and to output a timing judgment result that is a result of the judging; and
an operation judgment unit to judge contents of a gesture operation performed by the operator based on the timing judgment result and the movement information.

17. A gesture judgment method comprising:
detecting a reference part in a plurality of frame images successively acquired as captured images and outputting reference part information indicating a reference part region where the reference part exists in regard to each of the plurality of frame images;
extracting movement between frame images in the plurality of frame images and outputting movement information indicating a movement region where the movement occurred;
generating reference part disappearance information, indicating first timing of occurrence of a frame image in which the reference part is not detected, based on a result of the detecting indicated by the reference part information;
judging whether the first timing indicated by the reference part disappearance information and second timing of occurrence of a frame in which the movement region indicated by the movement information and the reference part region indicated by the reference part information overlap with each other are synchronized with each other or not and outputting a timing judgment result that is a result of the judging; and
judging contents of a gesture operation performed by an operator based on the timing judgment result and the movement information.

18. A gesture judgment device for judging contents of a gesture operation performed by an operator, comprising:
a processor to execute a program; and
a memory to store the program which, when executed by the processor, performs
detecting a reference part in a plurality of frame images successively acquired as captured images and outputting reference part information indicating a reference part region where the reference part exists in regard to each of the plurality of frame images;
extracting movement between frame images in the plurality of frame images and outputting movement information indicating a movement region where the movement occurred;
generating reference part disappearance information, indicating first timing of occurrence of a frame image in which the reference part is not detected, based on a result of the detecting indicated by the reference part information;

judging whether the first timing indicated by the reference part disappearance information and second timing of occurrence of a frame in which the movement region indicated by the movement information and the reference part region indicated by the reference part information overlap with each other are synchronized with each other or not and outputting a timing judgment result that is a result of the judging; and judging contents of a gesture operation performed by an operator based on the timing judgment result and the movement information.

* * * * *